US009103980B2

(12) United States Patent
Gipson

(10) Patent No.: US 9,103,980 B2
(45) Date of Patent: Aug. 11, 2015

(54) ADJUSTABLE MIRROR ASSEMBLY

(71) Applicant: Glenfield Gipson, St. Maarten (NL)

(72) Inventor: Glenfield Gipson, St. Maarten (NL)

( * ) Notice: Subject to any disclaimer, the term of this patent is extended or adjusted under 35 U.S.C. 154(b) by 0 days.

(21) Appl. No.: 14/056,436

(22) Filed: Oct. 17, 2013

(65) Prior Publication Data

US 2014/0111878 A1    Apr. 24, 2014

Related U.S. Application Data

(60) Provisional application No. 61/717,805, filed on Oct. 24, 2012.

(51) Int. Cl.
*G02B 7/182* (2006.01)
*A47G 1/02* (2006.01)

(52) U.S. Cl.
CPC ........ *G02B 7/182* (2013.01); *A47G 1/02* (2013.01); *A47G 2200/106* (2013.01)

(58) Field of Classification Search
CPC ............ G02B 7/00; G02B 7/18; G02B 7/182; A47G 1/16; A47G 1/17; A47G 1/142; A47G 1/1606; A47G 1/1613
USPC ......... 248/466, 467, 469, 473, 474, 476, 488, 248/449, 441.1, 549
See application file for complete search history.

(56) References Cited

U.S. PATENT DOCUMENTS

| 3,330,524 A * | 7/1967 | Foley ..................... 248/444.1 |
| 4,159,836 A * | 7/1979 | Tarr ........................ 281/45 |
| 4,302,192 A * | 11/1981 | Hamburger ................ 434/95 |
| 4,339,104 A | 7/1982 | Weidman |
| 4,605,292 A * | 8/1986 | McIntosh ................. 359/870 |
| 4,610,414 A * | 9/1986 | Schuck .................... 248/449 |
| D329,753 S | 9/1992 | Delafield |
| 5,681,100 A | 10/1997 | Powell |
| D395,956 S | 7/1998 | Zaidman |
| D407,906 S | 4/1999 | Warshawsky |
| 6,098,820 A * | 8/2000 | Smith ..................... 211/132.1 |
| D444,634 S | 7/2001 | Dodson |
| 6,298,591 B1 * | 10/2001 | Healy ...................... 40/600 |
| D527,916 S | 9/2006 | O'Hare |
| 7,278,621 B1 * | 10/2007 | Bareis .................... 248/441.1 |
| 8,220,880 B1 | 7/2012 | Lin |
| 2002/0104244 A1 * | 8/2002 | Moss et al. ................ 40/610 |
| 2003/0164436 A1 * | 9/2003 | Rooker ................... 248/441.1 |
| 2005/0017149 A1 * | 1/2005 | Wu ........................ 248/441.1 |
| 2005/0092705 A1 * | 5/2005 | Moss et al. ............... 211/132.1 |

* cited by examiner

*Primary Examiner* — Scott J Sugarman
*Assistant Examiner* — William R Alexander
(74) *Attorney, Agent, or Firm* — Daniel Boudwin; Global Intellectual Property Agency LLC

(57) ABSTRACT

An adjustable mirror device is provided that includes a free-standing or wall-mountable construction, whereon a mirror frame is slidably mounted thereto without the use of fasteners. A free-standing mirror support comprises an upstanding mirror frame support having a first and second side rail and lower support legs that allow the side rails to remain in an upright configuration without secondary support. The wall-mountable mirror support comprises a fastenable frame that affixes to a wall for supporting the mirror frame in the same manner as the free-standing embodiment. The mirror frame backside surface comprises a first and second magnetic strip running vertically therealong. These strips secure to ferric material strip extending along each side rail of the free-standing or wall-mountable mirror frame support embodiment. The magnetic attachment allows the user to slidably reposition the mirror without fasteners or tools.

2 Claims, 3 Drawing Sheets

ADJUSTABLE MIRROR ASSEMBLY

CROSS REFERENCE TO RELATED APPLICATION

This application claims the benefit of U.S. Provisional Application No. 61/717,805 filed on Oct. 24, 2012, entitled "Adjustable Standing Mirror." The above identified patent application is herein incorporated by reference in its entirety to provide continuity of disclosure.

BACKGROUND OF THE INVENTION

1. Field of the Invention

The present invention relates generally to mirrors, and more specifically to mirror assemblies that allow a user to slidably adjust the mirror position relative to its support without using any tools.

An item that is commonly found in every household and used on a daily basis is a mirror. A mirror is a well-known object that reflects light in a manner that preserves as much of the original light quality as possible, subsequent to its contact with the mirror. This allows a user to stand in front of the mirror while dressing to view the user's overall appearance prior to going into the public. While a variety of mirror types exist in the art and are available for sale, the most familiar mirror type is the plane mirror, which has a flat reflective surface. Flat mirrors are commonly used for personal grooming purposes or for decorating an interior space.

One of the most commonly used plane mirror types is a full length mirror. Full length mirrors enable users to see a larger portion of themselves when standing in front of the same, which is a major advantage over handheld or smaller mirror types. Full length mirrors are often mounted onto swivels and attached to a frame, or are mounted to a wall. These mirrors are dressing mirrors or cheval mirrors. The swivel configuration of a cheval mirror enables adjustment of the viewing angle of the mirror surface, while enables the user to view different portions of the body while dressing or grooming.

The present invention contemplates a new mirror structure that supports a mirror frame in a slidable configuration rather than in a swiveling configuration. The present assembly supports a full length dressing mirror with magnetic backing strips along the rear surface of the mirror frame, wherein a mirror support is provided having elongated ferric metallic strips to secure the magnetic strips thereto. The mirror support is either self-standing or wall-mountable, wherein the side rails of the support allows the mirror frame to be positioned at a desired elevation relative to the side rails using the magnetic strips as attachment means. The combination of the magnetic mirror and the metallic base frame enables a user to adjust the mirror as needed for viewing.

2. Description of the Prior Art

Devices have been disclosed in the prior art that relate to adjustable mirror structures. These include devices that have been patented and published in patent application publications, and generally relate to swivel mirrors or decorative mirror designs. No devices anticipate a slidable mirror frame using a magnetic attachment means as a way to adjust the mirror frame position relative to a user. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 5,681,100 to Powell, which discloses a cheval mirror having a concealed storage compartment. The compartment is stowed behind the mirror surface, wherein the mirror surface is a hinged from the compartment for revealing its contents. The mirror and compartment are pivotably attached to an upstanding frame that connects to both sides of the mirror at a single point, allowing rotation of the mirror surface about a common pivot axis. This mirror configuration is typical in the art of cheval mirrors, and allows a user to tilt the mirror upwards or downward to view different portions of the user's body while grooming or dressing. The present invention contemplates a new adjustable mirror surface that is slidable in a vertical fashion along the side rails of a mirror support device. The support device is wall-mounted or freestanding.

A similar mirror architecture in the art is U.S. Pat. No. 8,220,880 to Lin, which discloses a similar assembly as that of Powell, but with a rear link that secures the mirror in a given tinted orientation and locks the mirror in that position. Similar to the Powell device, the Lin device is pivotable about a common axis to allow for tilting the mirror surface. The present invention contemplates a slidably adjustable mirror structure, rather than a tilting device.

Finally, U.S. Pat. No. 4,339,104 to Weidman discloses another adjustable mirror construction in which an upright stand is provided for supporting a tilting mirror in an elevated position. This configuration offers a tilting mirror in a similar fashion as Lin and Powell, however in an adjustably elevated position above the ground. The mirror pivot arms are supported by an extendable shaft, which connects to a base that allows the shaft to rotate. Therefore, the mirror can be elevated, swiveled about a horizontal axis, or rotated about a vertical axis. The Weidman device is a unique structure in the art, but fails to anticipate the novel aspects of the present invention.

The present invention is a new mirror support device that includes a slidable mirror frame and a mirror support device that is self-standing or wall-mountable. The support device includes a first and second side rail having ferric material strips therealong, which align with magnetic strips along the backside of the mirror frame. The mirror magnetic strips secure to the support device rails and can slide therealong or be removed and repositioned along the rails.

It is submitted that the present invention is substantially divergent in design elements from the prior art, and consequently it is clear that there is a need in the art for an improvement to existing adjustable mirror devices. In this regard the instant invention substantially fulfills these needs.

SUMMARY OF THE INVENTION

In view of the foregoing disadvantages inherent in the known types of adjustable mirrors now present in the prior art, the present invention provides a new adjustable mirror assembly that can be utilized for providing convenience for the user when using the mirror for dressing or grooming, and adjusting the mirror vertically as necessary.

It is therefore an object of the present invention to provide a new and improved adjustable mirror assembly that has all of the advantages of the prior art and none of the disadvantages.

It is another object of the present invention to provide an adjustable mirror assembly that allows the user to adjust the mirror position along a vertical path, whereby the mirror can be used for taller or shorter individuals and the mirror position can be adjusted without tools.

Another object of the present invention is to provide an adjustable mirror assembly that includes a freestanding mirror support assembly or a wall-mounted mirror support assembly.

Yet another object of the present invention is to provide an adjustable mirror assembly that does not use any fasteners or tools to mount the mirror, whereby the mirror frame can be provided in several different designs to suit the user and his or her tastes.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
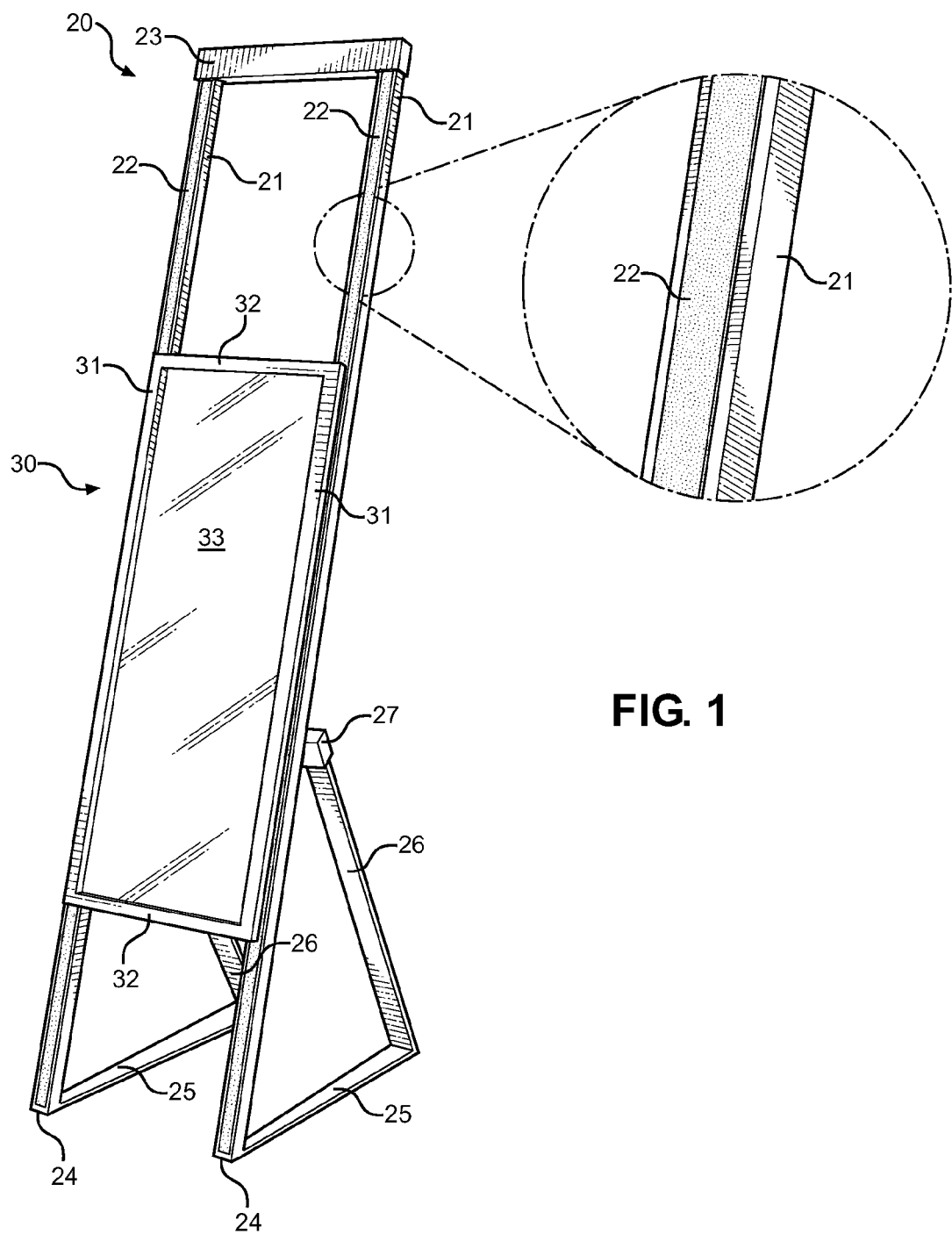
FIG. 1 shows a perspective view of the freestanding embodiment of the present invention and a close-up of the attachment between the mirror frame and the mirror support assembly.

Reference is made herein to the attached drawings. Like reference numerals are used throughout the drawings to depict like or similar elements of the adjustable mirror assembly. For the purposes of presenting a brief and clear description of the present invention, the preferred embodiment will be discussed as used for providing a user with an adjustable mirror frame and mirror support assembly that does not require the user to fasten or unfasten the mirror frame when adjusting the same in a vertical fashion. The figures are intended for representative purposes only and should not be considered to be limiting in any respect.

Figure 2:
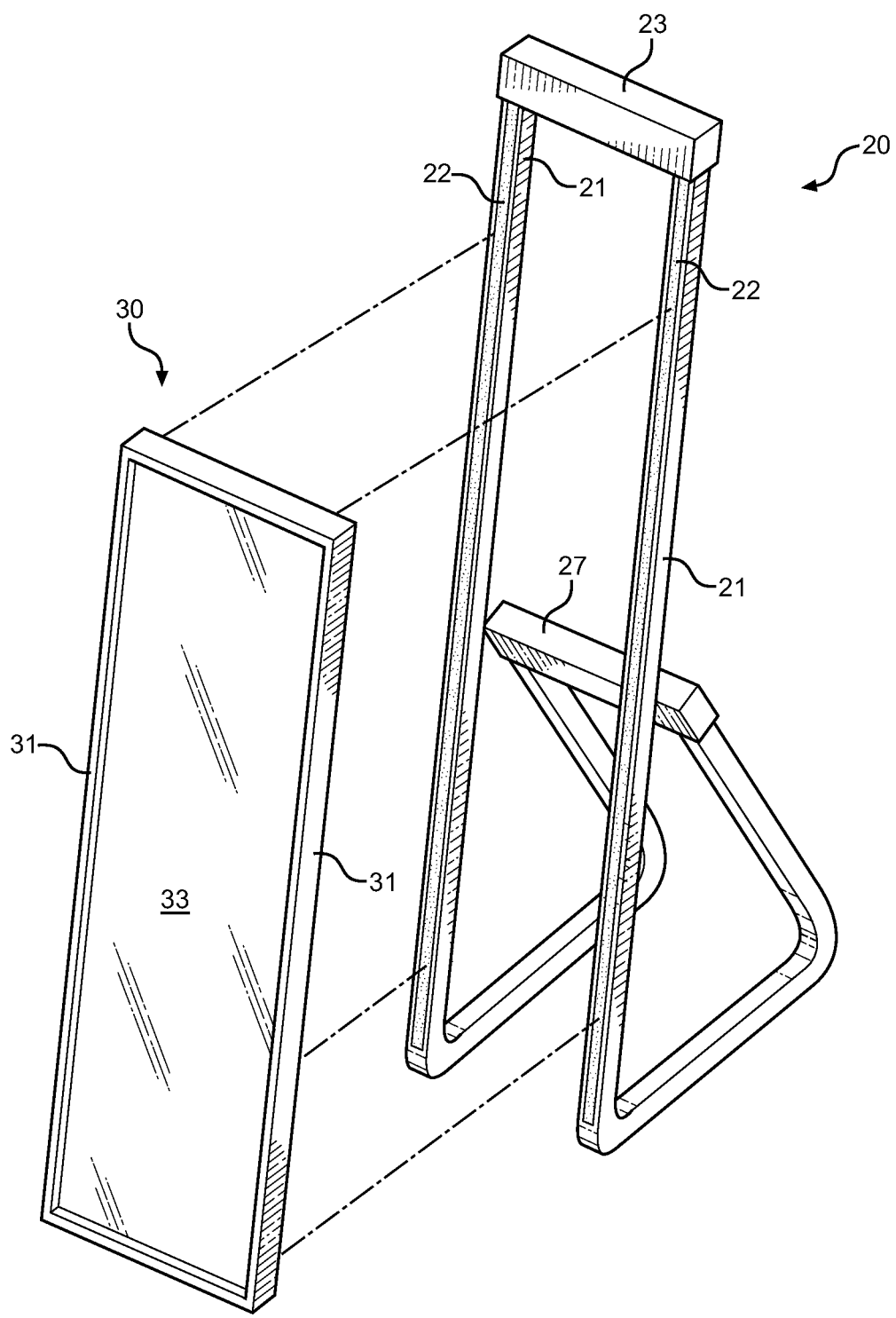
FIG. 2 shows an exploded view of the mirror frame and the mirror support assembly of the present invention.

Referring now to FIGS. 1 and 2, there are shown perspective views of the adjustable mirror assembly of the present invention in its freestanding configuration. The assembly comprises a mirror frame 30 having a frontside mirrored surface 33 and a backside surface adapted to secure to the rails 22 of a mirror support assembly 20. The mirror frame comprises a pair of vertical frame sides 31 and an upper and lower frame horizontal member 32 bounding the mirrored surface 33. The shape and design of the frame may take on many forms, where the user's style and preferences may dictate the ornamental design thereof.

Figure 4:
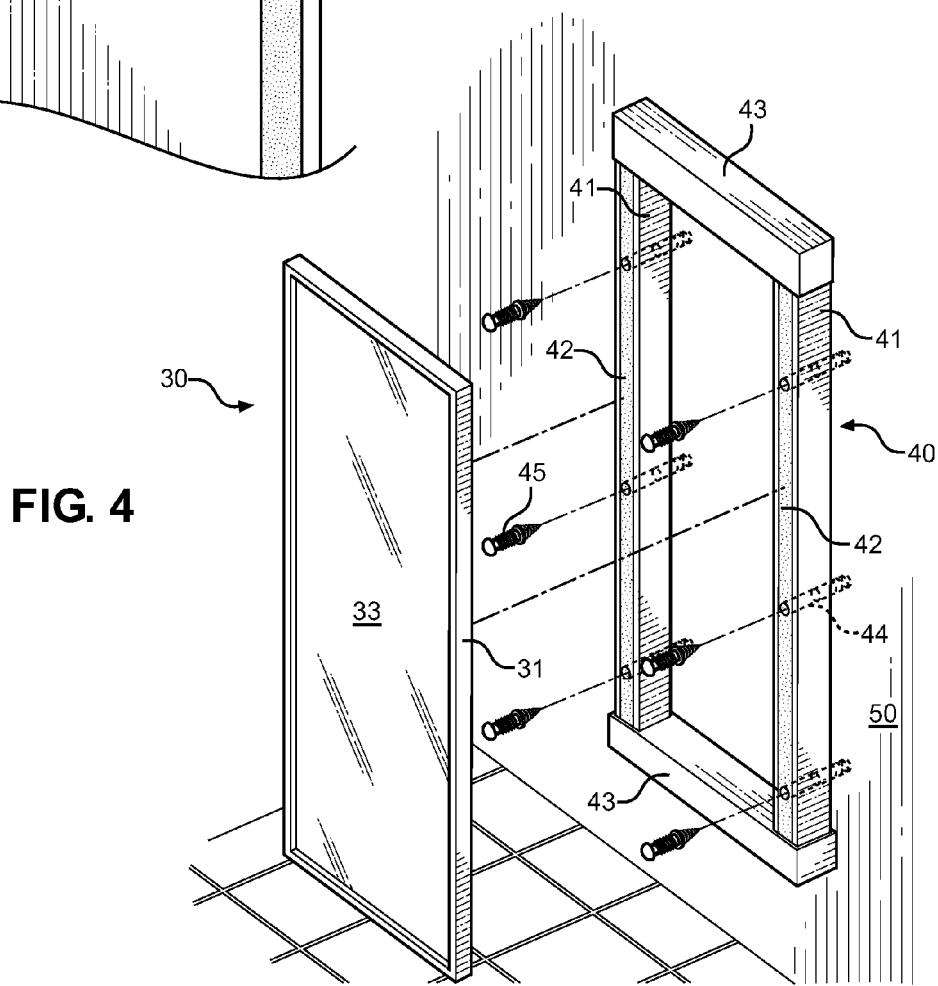
FIG. 4 shows the wall-mounted embodiment of the mirror support assembly of the present invention.

The mirror support assembly 20 comprises one of two embodiments: a freestanding embodiment (FIGS. 1 and 2), and a wall-mounted embodiment (FIG. 4). The freestanding embodiment comprises a pair of support rails 22 that are upwardly extending and parallel to one another. These rails 22 are supported at their lower extent 24 by a pair of footer member, which comprises a horizontal lower member 25 and an upwardly extending backside member 26. The footer members and the rails 22 form a largely triangular base for the support assembly 20 to maintain the rails 22 in a largely upstanding configuration and freestanding without additional support. It is preferable to position the rails 21 at a slight acute angle with respect to the footer horizontal member 25 to direct the reflection from the mirror surface 22 upward toward a standing user.

Each of side rails 21 of the mirror support assembly 20 comprises an elongated strip of material 22 therealong. This strip of material 22 is a ferric material that is adapted to create an area of attachment along the rail for corresponding magnetic strips along the rear of the mirror frame 30. The material strips 22 extend the entire length of the rails 21 such that the mirror frame 30 can be attached therealong at different positions vertically along the rails 21, wherein the mirror frame 30 is smaller in height than the height of each rail 21. In this way, the user is free to slide the mirror 30 upwards or downwards along the rail without removing or re-securing fasteners in the process, or the mirror 30 can be removed from the rails 21 altogether and positioned at a different height therealong.

To maintain the separation of the rails 21 of the mirror support assembly 20, an upper 23 and lower 27 end cap are provided. The end caps secure over the ends of the rails 21 and separate the rails a given distance, ensuring both rails remain in parallel to one another and the assembly 20 is stable during use. The end caps 23, 27 further stabilize each of the rails 21 and maintain their freestanding position while deployed and while supporting the mirror therealong. It is contemplated that the end caps are separable elements provided to the user during assembly of the device after purchase.

Figure 3:
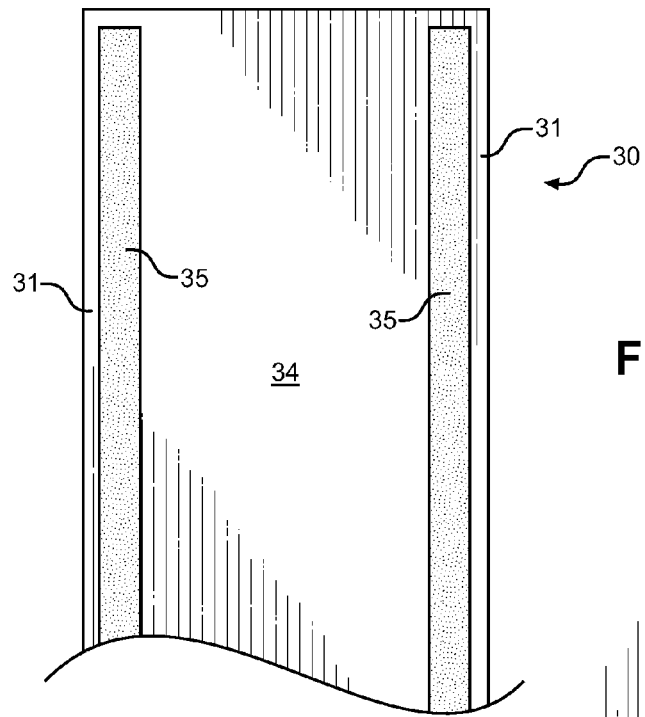
FIG. 3 shows the backside of the mirror frame of the present invention.

Referring now to FIG. 3, there is shown the backside of the mirror frame 30 of the present invention. The backside surface 34 of the mirror 30 is a planar surface that supports a first and second magnetic strip 35 therealong. The magnetic strips 35 extend from the top of the mirror to the bottom and are separated a distance that equals the separation distance of the material strips along the rails when the end caps are applied. The magnetic strips 35 secure to the material strips along the rails of the mirror support assembly.

The mirror surface itself along the frontside of the mirror is comprised of a conventional mirror material, manufactured by applying a reflective coating to a suitable substrate. Preferably, the substrate is glass which is used due to its transparency, ease of fabrication, rigidity, hardness, and ability to take a smooth finish. The reflective coating is applied to the back surface of the glass, so that the reflecting side of the coating is protected from corrosion and accidental damage.

Referring now to FIG. 4, there is shown a view of the mirror support assembly of the present invention in its second contemplated configuration, wherein the assembly 40 is wall-mountable. The wall-mountable assembly 40 allows the mirror frame 30 to be positioned against a vertical support surface 50 rather than be positioned against a freestanding article. The wall-mountable assembly 40 comprises and upper and lower member 43 secured to a first and second side rail member 41 to form a rectangular assembly. Through the side rails 41 are fastener locations 44, through which fasteners 45 are inserted to secure the assembly 40 to a supporting wall surface 50.

In the same fashion as the freestanding embodiment, the wall-mountable assembly 40 includes ferric material strips 42 along each of the side rails 41 for magnetically supporting the mirror frame 30 therealong. The material strips 42 extend along the entire length of the side rails 41 and are separated by a distance from one another that corresponds to the spacing of the magnetic strips along the rear of the mirror frame 30. As with the freestanding embodiment, the wall-mountable assembly 40 allows the mirror frame 30 to be slid or repositioned along the rails 41 as desired to dictate the positional height of the frame therealong.

Overall, the present invention provides an adjustable mirror assembly that allows the user to adjustably slide or reposition the mirror frame in a vertical path, thereby accommodating users of different stature while grooming or dressing. The assembly requires no tools to relocate the mirror along the mirror support assembly side rails, and the assembly can be provided as a freestanding article or as a wall-mountable structure.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable mirror assembly, comprising:
    a mirror frame having a frontside surface and a backside surface;
    said frontside surface having a reflective mirror surface;
    said backside surface comprising a first magnetic strip and a second magnetic strip;
    a mirror support assembly;
    said mirror support assembly comprising a first side rail that is parallel to a second side rail;
    each of said first side rail and said second side rail having an elongated strip of ferric material therealong;
    wherein said first magnetic strip is directly aligned with said first side rail and said second magnetic strip is directly aligned with said second side rail;
    each of said first side rail and said second side rail extending beyond said mirror frame such that said mirror frame can be adjusted in height as said mirror frame slides along said mirror support assembly;
    a footer member extending from a lower extent of each of said first side rail and said second side rail;
    each of said footer members comprising a horizontal member and a backside member;
    each of said foot members supporting each of said first side rail and said second side rails in an upstanding configuration such that each of said first side rail and said second side rail is freestanding;
    a first elongated member that removably fits over an upper end of said first side rail and an upper end of said second side rail;
    a second elongated member that removably fits over said backside member of said first side rail and said backside member of said second side rail;
    wherein said first elongated member and said second elongated member are adapted to separate and stabilize said first side rail and said second side rail;
    said horizontal member, said backside member, and one of said first side rail or said second side rail forming a substantial triangular shape, wherein said backside member is not attached to said first side rail or said second side rail.

2. An adjustable mirror assembly, comprising:
    a mirror frame having a frontside surface, a backside surface, and an upper frame horizontal member opposite a lower frame horizontal member;
    wherein a distance between said upper frame horizontal member and said lower frame horizontal member defines a length of said mirror frame;
    said frontside surface having a reflective mirror surface;
    said backside surface comprising a first magnetic strip opposite a second magnetic strip;
    wherein said first magnetic strip is parallel to said second magnetic strip;
    a mirror support assembly comprising a first side rail that is parallel to a second side rail;
    each of said first side rail and said second side rail having an upper extent and a lower extent;
    wherein a distance between said upper extent and said lower extent defines a length of said mirror support assembly;
    said length of said mirror support assembly greater than said length of said mirror frame;
    each of said first side rail and said second side rail having an elongated strip of ferric material;
    wherein a distance between said first magnetic strip and said second magnetic strip is substantially equal to a distance between said first side rail and said second side rail, such that said first magnetic strip is directly aligned with said strip of ferric material of said first side rail and said second magnetic strip is directly aligned with said strip of ferric material of second side rail;
    a footer member extending from a lower extent of each of said first side rail and said second side rail;
    said footer member comprises a horizontal member and a backside member;
    said footer member supporting each of said first side rail and said second side rails rail in an upstanding configuration such that each of said first side rail and said second side rail is freestanding;
    a first elongated member that removably fits over an upper end of said first side rail and an upper end of said second side rail;
    a second elongated member that removably fits over said backside member of said first side rail and said backside member of said second side rail;
    wherein said first elongated member and said second elongated member are adapted to separate and stabilize said first side rail and said second side rail;
    said horizontal member, said backside member, and one of said first side rail or said second side rail forming a substantial triangular shape, wherein said backside member is not attached to said first side rail or said second side rail.

* * * * *